United States Patent Office 2,932,656
Patented Apr. 12, 1960

2,932,656

PRODUCTION OF $\Delta^{1,4}$-3,20-DIKETOPREGNA-DIENES FROM THE CORRESPONDING SEMICARBAZONES John T. Day, Danville, Pa., assignor to Merck & Co., Inc., Rahway, N.J., a corporation of New Jersey No Drawing. Application June 19, 1957
Serial No. 666,769

4 Claims. (Cl. 260—397.45)

This invention relates to processes for producing $\Delta^{1,4}$-3,20-diketo-11$\beta$,17$\alpha$,21-trihydroxypregnadiene compounds having cortisone-like, anti-inflammatory activity.

The $\Delta^{1,4}$-3,20-diketo - 11$\beta$,17$\alpha$,21 - trihydroxypregnadienes, such as prednisolone, 9$\alpha$-fluoroprednisolone, 9$\alpha$-fluoro-16$\alpha$-hydroxyprednisolone, and 16$\alpha$-methylprednisolone, are highly active, anti-inflammatory agents having greater activity than cortisone with less pronounced side effects. These compounds are difficult to synthesize because the 11$\beta$-hydroxyl group is prone to oxidation to an 11-keto group during the multi-step synthesis of the pregnadiene compound. The 11$\beta$-hydroxy group cannot be protected from oxidation by ester formation because of steric hindrance as is well-known. In a multi-step synthesis of steroids containing an 11$\beta$-hydroxyl group, it is advisable to form the 11$\beta$-hydroxyl group near the completion of the synthesis so as to minimize the oxidation to the corresponding 11-keto steroid. This can be done in the synthesis of hydrocortisone by reducing the 3,20-disemicarbazone of cortisone 21-acetate to the 3,20-disemicarbazone of hydrocortisone, and hydrolyzing the 3,20-disemicarbazone to hydrocortisone itself in a moderately strong to strongly acidic solution. Other $\Delta^4$-3,20-diketo-11$\beta$,17$\alpha$,21-trihydroxypregnenes can also be formed by a similar synthesis. This method has not been useful heretofore for the synthesis of prednisolone and other $\Delta^{1,4}$-3,20-diketo-11$\beta$,17$\alpha$,21-trihydroxypregnadienes, since the 3,20-disemicarbazones of these compounds could not be converted in more than slight yield to the corresponding 3,20-diketo compounds. Other methods prior to this invention were likewise unsuccessful in removing the semicarbazide groups from 3,20-disemicarbazones of prednisolone and related compounds. For example, Herzog, et al., J. Am. Chem. Soc. 77, 4781–4784, reported the conversion of the 3,20-disemicarbazone of prednisolone to prednisolone itself in a yield of only 5 percent According to the present invention it has been found that the 3,20-disemicarbazones of $\Delta^{1,4}$-3,20-diketo-11$\beta$ 17$\alpha$,21-trihydroxypregnadienes, such as prednisolone, can be hydrolyzed in dilute acid medium to remove the semicarbazido groups and thereby form the corresponding $\Delta^{1,4}$-3,20-diketo-11$\beta$,17$\alpha$,21 - trihydroxypregnadienes. This is surprising in view of the previous unsuccessful attempts to accomplish the same result, plus the fact that dilute acid is incapable of hydrolyzing the 3,20-disemicarbazones of $\Delta^4$-3,20-diketopregnenes. The acid strength of the medium should not exceed about 0.5 N and is ordinarily about 0.25 N. More dilute acid media, as low as about 0.1 N, may also be used.

The starting materials for the process of the present invention are the 3,20-disemicarbazones of $\Delta^{1,4}$-3,20-diketo-11$\beta$,17$\alpha$,21-trihydroxypregnadienes, such as prednisolone, 9$\alpha$-fluoroprednisolone, 9$\alpha$-fluoro-16$\alpha$-hydroxyprednisolone, and 16$\alpha$-methylprednisolone. These compounds can be prepared from the corresponding $\Delta^{1,4}$-3,11,20-triketo-17$\alpha$,21-dihydroxypregnadienes, such as prednisone, 9$\alpha$-fluoroprednisone, 9$\alpha$-fluoro-16$\alpha$-hydroxyprednisone, and 16$\alpha$-methylprednisone, respectively, by the method of Herzog, et al., cited supra. According to the Herzog process the $\Delta^{1,4}$-3,11,20-triketo-17$\alpha$,21-dihydroxypregnadiene compound or a 21-ester thereof, such as the 21-acetate, is converted to the corresponding 3,20-disemicarbazone, which in turn is reduced with potassium borohydride to form the 3,20-disemicarbazone of the corresponding $\Delta^{1,4}$-3,20-diketo-11$\beta$,17$\alpha$,21-trihydroxypregnadiene. These steps proceed in good yield in the conversion of prednisone acetate to prednisolone 3,20-disemicarbazone according to Herzog, et al.

The 3,20-disemicarbazone of the $\Delta^{1,4}$-3,20-diketo-11$\alpha$ 17$\alpha$,21-trihydroxypregnadiene is converted to the corresponding 3,20-diketo compound according to this invention by the action of dilute aqueous acid in the presence of a water-immiscible organic solvent. This solvent may be either a single compound or a mixture of compounds. For example, methyl isobutyl ketone, methyl isopropyl ketone, and various solvent mixtures such as chloroform-acetone, chloroform-tetrahydrofuran, and ethylene dichloride-methyl ethyl ketone may be used as the solvent for the steroid in the process of the present invention. The reaction may be carried out at any temperature desired, and temperatures ranging from room temperature to reflux temperature have all been found to be quite satisfactory for carrying out the process. The acid strength of the aqueous phase is preferably about 0.25 N and not greater than about 0.5 N. Acid strengths as low as 0.1 N are permissible, although, in general, the acid strength is somewhat greater so as to avoid an unduly high volume of water in the system. Hydrochloric acid is a preferred acid, although other common mineral acids, such as sulfuric and phosphoric acids, may be used instead. The amount of acid may be either a theoretical quantity, i.e., 2 moles of acid per mole of steroid, or the acid may be present in excess.

The $\Delta^{1,4}$-3,20-diketo-11$\beta$,17$\alpha$,21-trihydroxypregnadiene is recovered from the organic solvent after completion of the acid hydrolysis. This is accomplished by any desired conventional means such as evaporation of the solvent. The resulting steroid may then be purified by the usual techniques such as decolorization with charcoal, followed by recrystallization from a suitable solvent such as methanol.

This invention will now be illustrated with respect to the following example:

*Example*

To an aqueous slurry of about 23.05 g. of prednisolone-3,20-disemicarbazone were added 680 ml. of water, enough concentrated hydrochloric acid to adjust the acid strength to 0.25 N and 460 ml. of a 3:2 (by volume) mixture of ethylene dichloride and methyl ethyl ketone. The system was purged several times by alternately evacuating to 15 inches of mercury and pressuring to 2 p.s.i.g. with nitrogen gas. The system was heated at reflux (about 73° to 75° C.) for 15 minutes with vigorous agitation under 1 to 2 p.s.i.g. nitrogen pressure. The reaction mixture was cooled slightly and the layers separated. The aqueous layer was again heated at reflux with six portions of a 3:2 mixture of ethylene dichloride and methyl ethyl ketone in the volumes and for the times indicated; first and second portions, 230 ml. and 15 minutes each; third and fourth portions, 115 ml. and 30 minutes each; fifth and sixth portions, 57.5 ml. and 60 minutes each. After refluxing with the third portion, the combined organic layers from the first three portions were washed with two 50-ml. portions of 0.5 N hydrochloric acid. The acid wash was added to the aqueous medium for refluxing with the fifth and sixth portions of organic solvent. After all six refluxes had been completed, the aqueous layer was extracted with two 50-ml.

portions of 3:2 ethylene dichloride-methyl ethyl ketone at room temperature. The combined solvent system was washed successively with 100 ml. of 0.5 N hydrochloric acid, 100 ml. of 5% aqueous sodium bicarbonate, and 100 ml. of water. Each of the resulting aqueous layers was extracted successively with 50 ml. of 3:2 ethylene dichloride in methyl ethyl ketone. The organic solvent layers were combined and the combined solution treated with 3.6 g. of decolorizing charcoal at 35° C. for 10 minutes. The charcoal was removed by filtration and washed with two 75-ml. portions of 3:2 ethylene dichloride in methyl ethyl ketone. The nearly colorless solution was concentrated in vacuo with the simultaneous addition of 370 ml. of water. Concentration was continued until the temperature rose, the mixture foamed, and the volume was about 350 ml. The slurry was cooled and aged at 0° to +4° C. for 60 minutes. The crude prednisolone was removed by filtration, washed with water, and air-dried.

The above example illustrates merely one procedure by which compounds may be treated according to the present invention. The above procedure may be simplified considerably by refluxing a mixture of aqueous 0.25 N hydrochloric acid and an organic phase consisting of a 3:2 mixture of ethylene dichloride and methyl ethyl ketone for about 90 minutes, at which time the removal of the semicarbazido groups is complete.

For purposes of illustration the conversion of prednisolone-3,20-disemicarbazone to prednisolone has been given in detail. Similar procedures for conversion of the 3,20-disemicarbazones of 9α-fluoroprednisolone, 9α-fluoro-16α-hydroxyprednisolone, 16α-methylprednisolone, and other $\Delta^{1,4}$-3,20-diketo-11β,17α-21-trihydroxypregnadienes may also be carried out. The process of this invention can also be carried out on the corresponding 21-lower aliphatic carboxylic acid esters, such as prednisolone 21-acetate 3,20-disemicarbazone and the like.

While the foregoing invention has been described in detail with respect to illustrative embodiments thereof, it is understood that the scope of this invention is measured only by the scope of the appended claims.

What is claimed is:

1. In a process for preparing a compound selected from the group consisting of the $\Delta^{1,4}$-3,20-diketo-11β,17α,21-trihydroxy pregnadienes and 21-lower aliphatic carboxylic acid esters thereof from the corresponding 3,20-disemicarbazone, the improvement which comprises reacting said 3,20-disemicarbazone with a dilute mineral acid having a concentration not greater than 0.5 N in the presence of a water-immiscible organic solvent, and recovering the steroid product from said solvent.

2. The process of claim 1 in which the acid is hydrochloric acid.

3. In a process for preparing prednisolone from the 3,20-disemicarbazone thereof, the improvement which comprises reacting said 3,20-disemicarbazone with a dilute mineral acid having a concentration not greater than 0.5 N in the presence of a water-immiscible organic solvent, and recovering the prednisolone from said solvent.

4. In a process for preparing prednisolone from the 3,20-disemicarbazone thereof, the improvement which comprises reacting said 3,20-disemicarbazine with hydrochloric acid having a concentration not greater than 0.5 N in the presence of a water-immiscible organic solvent, and recovering the prednisolone from said solvent.

References Cited in the file of this patent

UNITED STATES PATENTS 2,781,367  Day ------------------ Feb. 12, 1957